(12) United States Patent
Zheng et al.

(10) Patent No.: US 12,517,421 B2
(45) Date of Patent: Jan. 6, 2026

(54) STORY PROJECTOR

(71) Applicant: Shenzhen Bolong Technology Co. Ltd., Shenzhen (CN)

(72) Inventors: Huazhu Zheng, Shenzhen (CN); Caijian Zheng, Shenzhen (CN); Wenzhen Ouyang, Shenzhen (CN); Yunyun Lu, Shenzhen (CN)

(73) Assignee: Shenzhen Bolong Technology Co. Ltd., Shenzhen (CN)

( * ) Notice: Subject to any disclaimer, the term of this patent is extended or adjusted under 35 U.S.C. 154(b) by 0 days.

(21) Appl. No.: 19/252,790

(22) Filed: Jun. 27, 2025

(65) Prior Publication Data

US 2025/0321475 A1    Oct. 16, 2025

(30) Foreign Application Priority Data

Apr. 3, 2025   (CN) .......................... 202520632857.9

(51) Int. Cl.
  *G03B 23/10*   (2006.01)
  *G03B 21/00*   (2006.01)
  *G03B 21/14*   (2006.01)

(52) U.S. Cl.
  CPC ......... *G03B 23/105* (2013.01); *G03B 21/001* (2013.01); *G03B 21/145* (2013.01)

(58) Field of Classification Search
  CPC ....... G03B 23/105; G03B 21/14; G03B 21/20
  USPC .......................................................... 353/15
  See application file for complete search history.

(56) References Cited

U.S. PATENT DOCUMENTS

| | | | |
|---|---|---|---|
| 6,769,778 B1 * | 8/2004 | Lloyd .................... | G09B 27/06 434/285 |
| 9,028,076 B2 | 5/2015 | Nishima et al. | |
| 10,077,889 B1 | 9/2018 | Qin | |
| 10,203,105 B1 | 2/2019 | Zhang et al. | |
| 11,692,681 B1 * | 7/2023 | Zheng ....................... | F21V 5/04 362/257 |
| 11,698,187 B1 * | 7/2023 | Zheng ....................... | F21V 3/04 362/86 |
| D1,075,883 S * | 5/2025 | Zheng .................... | G03B 21/16 D16/221 |

(Continued)

FOREIGN PATENT DOCUMENTS

| | | | | |
|---|---|---|---|---|
| CN | 212694234 U | * | 3/2021 | ............. G03B 21/14 |
| CN | 213123384 U | * | 5/2021 | ............. G03B 21/14 |
| KR | 200246848 Y1 | * | 10/2001 | ............. G03B 23/00 |

*Primary Examiner* — Magda Cruz
(74) *Attorney, Agent, or Firm* — Ricky Lam

(57) ABSTRACT

The present invention discloses a story projector, used for projecting patterns on a film onto a light-shadow projection surface for display. The story projector includes: a body and a film disc that carries the film, where the body is provided with an insertion slot and a projection aperture, and the film disc is movably inserted into the insertion slot; and the film disc includes a housing and a rotating disc that is rotatably installed within the housing, with the film positioned on the rotating disc and disposed corresponding to the projection aperture. The body includes an optical assembly and a drive assembly located within the body, where the optical assembly emits light towards the projection aperture, and the film is located between the optical assembly and the projection aperture. The technical solutions of the present invention effectively improves the practicality of the story projector.

9 Claims, 6 Drawing Sheets

(56) References Cited

U.S. PATENT DOCUMENTS

2010/0172221 A1\* 7/2010 Osada .................. G11B 17/223
2012/0292158 A1\* 11/2012 Takasawa ............ G11B 17/225
　　　　　　　　　　　　　　　　　　198/604

\* cited by examiner

STORY PROJECTOR

TECHNICAL FIELD

The present invention relates to the technical field of projectors, and in particular, to a projector.

BACKGROUND

Currently, various projection devices have gained widespread application in the field of image display, especially in education and entertainment. Projectors, as a portable projection device, have attracted significant attention due to the simple structure and user-friendly operation. Conventional projectors primarily rely on mechanical transmission mechanisms to achieve directional projection of the film, typically employing conventional gear transmission systems. However, different types of gears exhibit limitations in transmission efficiency, torque transfer, and service life. For example, common bevel gears or spur gears are prone to issues such as poor meshing and significant transmission errors during long-term high-speed operation, ultimately compromising pattern display accuracy and projection effects. In addition, structural designs of some projectors suffer from loosening or wear at a plurality of mechanical connection points, thereby constraining the stability and durability of the entire transmission system.

SUMMARY

A main objective of the present invention is to propose a projector, aimed at improving the practicality of the projector.

To achieve the foregoing objectives, the projector provided in the present invention is used for projecting patterns on a film onto a light-shadow projection surface for display, including
 a body and a film disc that carries the film, where the body is provided with an insertion slot and a projection aperture, and the film disc is movably inserted into the insertion slot;
 the film disc includes a housing and a rotating disc that is rotatably installed within the housing, with the film positioned on the rotating disc and disposed corresponding to the projection aperture;
 the body includes an optical assembly and a drive assembly located within the body, where the optical assembly emits light towards the projection aperture, and the film is located between the optical assembly and the projection aperture; and
 the drive assembly includes a drive motor and a driving gear installed on a drive shaft on the drive motor, and one side of the rotating disc is provided with a driven gear that engages with the driving gear, where both the driving gear and the driven gear are face gears.

Optionally, an outer wall of the housing is provided with a guiding slot, and the driven gear is located within the guiding slot.

Optionally, the projector further includes an audio assembly housed within the body and an electronic tag installed on the film disc and electrically connected to the audio assembly; and
 the audio assembly includes a control panel, an identification module for identifying the electronic tag, a storage medium pre-stored with audio corresponding to the electronic tag, and a speaker electrically connected to the control panel.

Optionally, an inner wall of the body is provided with a mounting shell corresponding to the insertion slot, and the film disc passes through the insertion slot and is installed in the mounting shell; and
 the mounting shell is provided with at least one spring clip, where the spring clip abuts movably against the outer wall of the film disc.

Optionally, a side wall of the body is further provided with a plurality of storage slots for storing the film disc.

Optionally, the body further includes a handle, the outer wall of the body is provided with a movable slot, and the handle is movably installed in the movable slot.

Optionally, the body further includes a triggering mechanism, the triggering mechanism includes a push rod and a lift rod, the body is provided with a mounting hole, the mounting shell is provided with a movable hole, the lift rod passes through the movable hole and abuts against the film disc, one end of the lift rod close to the push rod is provided with a movable roller, the push rod passes through the mounting hole, one end of the push rod close to the movable roller is provided with an abutment block, and the abutment block is inclined on a side that abuts against the movable roller.

Optionally, a bottom of the mounting shell is provided with an operating cavity, and the movable roller and the abutment block are located within the operating cavity; and
 an operating button is provided at the other end of the push rod opposite the abutment block, the operating button is located inside the mounting hole, and a first reset spring is sleeve-mounted on an outer wall of the push rod, with one end of the first reset spring abutting against an outer wall of the operating cavity and the other end abutting against the operating button.

Optionally, a limiting base is disposed on an inner wall of the operating cavity corresponding to the movable hole, a top plate is provided at one end of the lift rod that abuts against the film disc, a limiting plate is provided at the other end, the limiting plate is located within the limiting base, a second reset spring is sleeve-mounted on the outer wall of the lift rod, with one end of the second reset spring abutting against the bottom of the mounting shell and the other end abutting against the limiting plate.

Optionally, the inner wall of the operating cavity is provided with a limiting slot, limiting blocks are disposed on both sides of the bottom of the abutment block, and the limiting blocks are slidably fitted into the limiting slot.

The projector according to the present invention includes the projector body and the film disc that carries the film. The body is provided with the insertion slot and the projection aperture, and the film disc is movably inserted into the insertion slot, to secure the film on the rotating disc corresponding to the projection aperture. The projector body is provided with the optical assembly and the drive assembly. The light emitted by the optical assembly travels along a fixed path, illuminating the film through the film disc, and then is output through the projection aperture to display the patterns. The drive assembly includes the drive motor and the driving gear installed on the drive shaft on the drive motor. The driving gear meshes with the driven gear disposed on the side of the rotating disc (both the driving gear and the driven gear are face gears), to ensure even and precise rotation of the rotating disc. According to the foregoing structural design, the film disc maintains stable positioning within the projector body while achieving smooth rotation under the action of the drive assembly. Even in cases of external vibrations or tilts, the patterns on the film can still be accurately aligned with the optical assembly and the projection aperture, to ensure the clarity, continuity, and stability of the projected images. Therefore, the projector according to the present invention not only facilitates convenient replacement and installation of the film disc but also significantly enhances the projection quality through the precise driving and optical system design, thereby greatly enhancing the device's practicality and user experience in actual applications.

BRIEF DESCRIPTION OF DRAWINGS

To more clearly illustrate technical solutions in embodiments of the present invention or in the prior art, the following briefly introduces accompanying drawings required in embodiments or the prior art. It is clear that the accompanying drawings in the following descriptions are only some embodiments of the present invention, and a person of ordinary skill in the art may still derive other drawings based on the structures shown in the accompanying drawings without creative efforts.

REFERENCE NUMERALS

Figure 1:
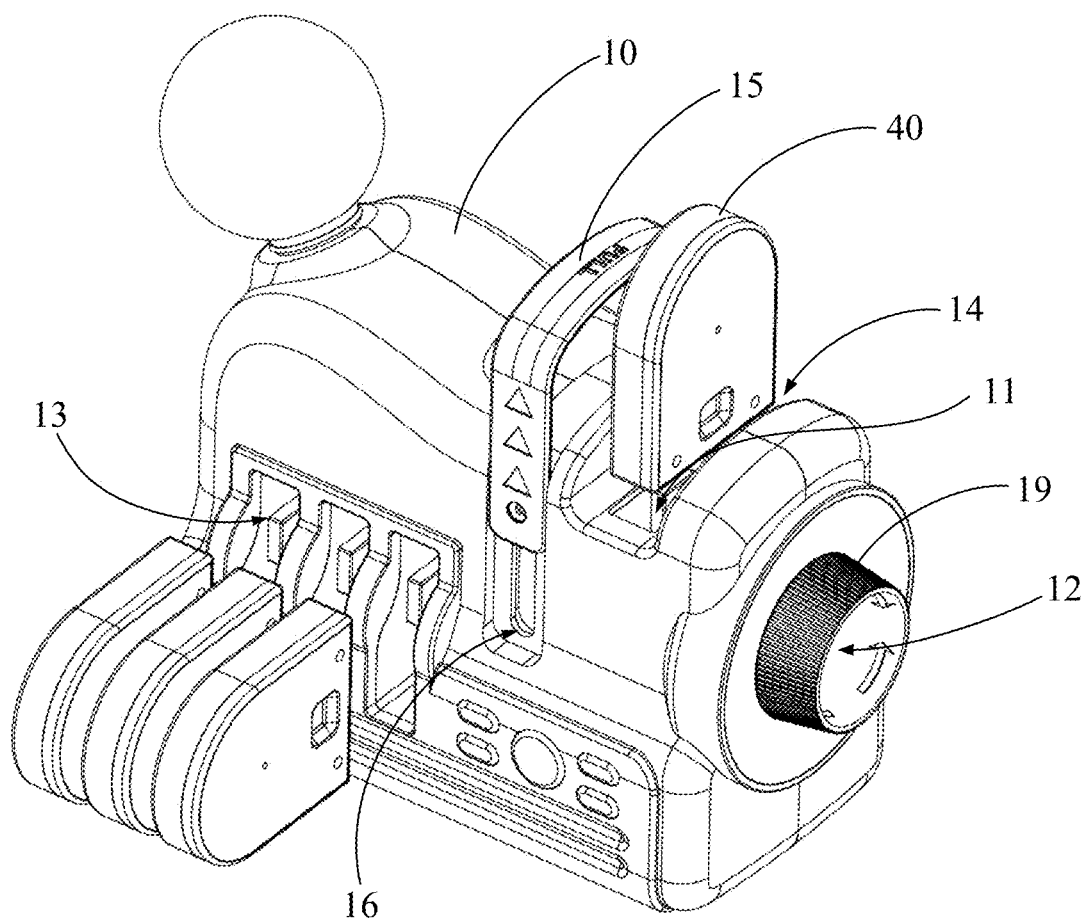
FIG. 1 is a diagram of an exploded structure of a projector at an angle according to the present invention.
Figure 2:
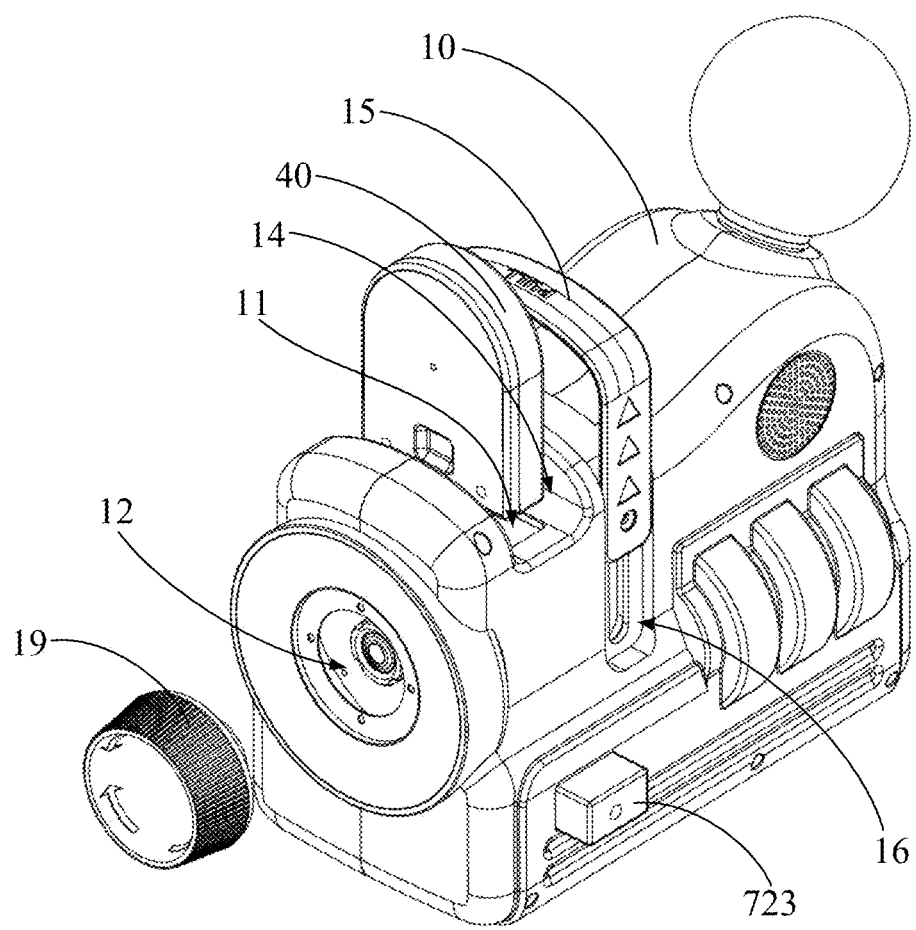
FIG. 2 is a diagram of an exploded structure of a projector at another angle according to the present invention.
Figure 3:
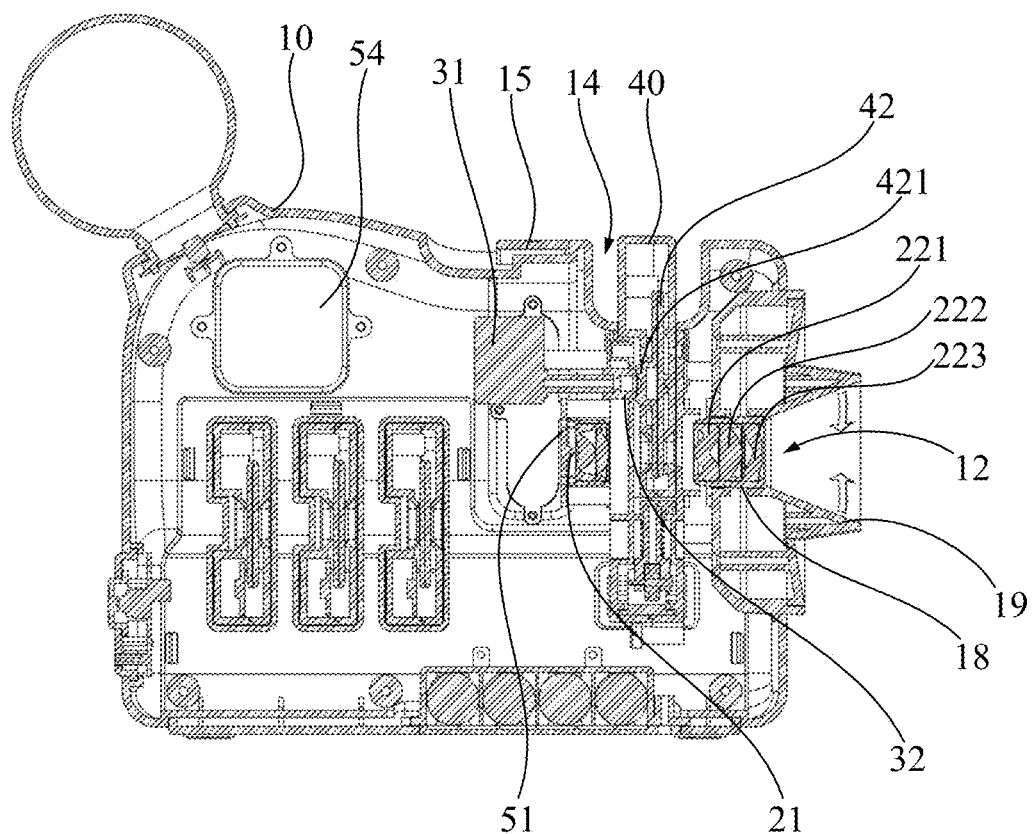
FIG. 3 is a diagram of a structure of a sectional view of a projector at an angle according to the present invention.
Figure 4:
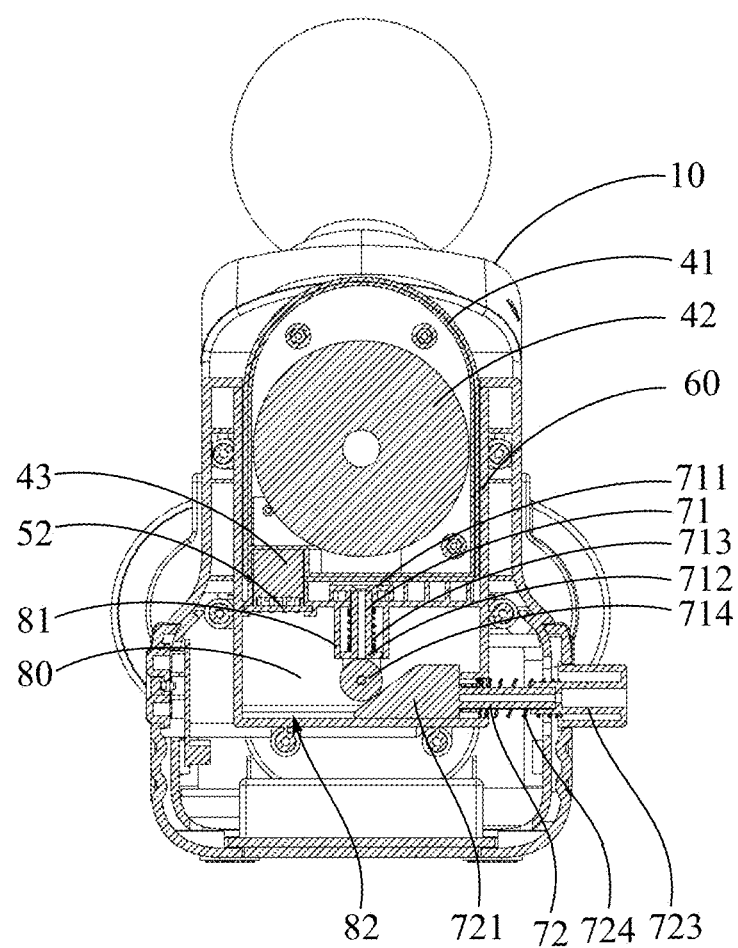
FIG. 4 is a diagram of a structure of a sectional view of a projector at another angle according to the present invention.
Figure 5:
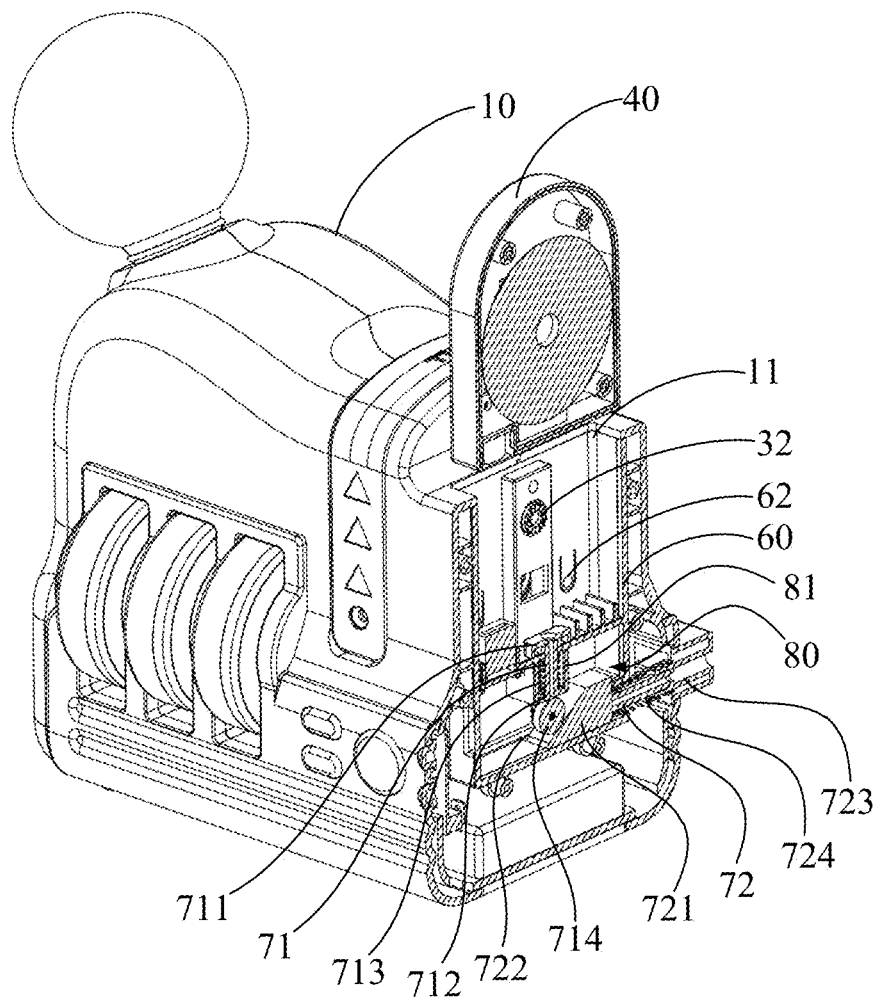
FIG. 5 is a diagram of a structure of a sectional view of a projector at still another angle according to the present invention.
Figure 6:
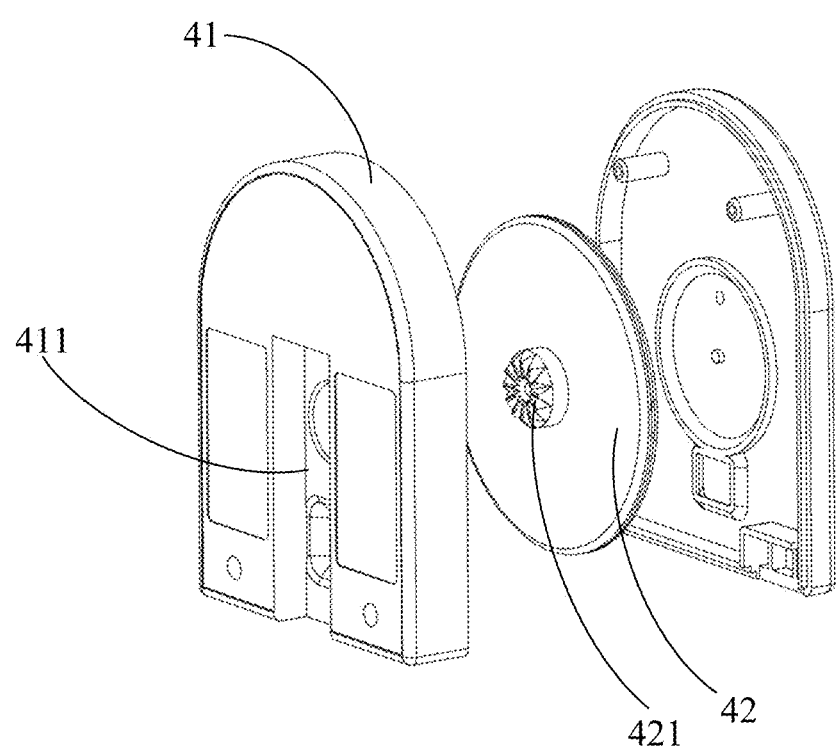
FIG. 6 is a diagram of an exploded structure of a film disc at an angle.

10—body; 11—insertion slot; 12—projection aperture; 13—storage slot; 14—avoidance slot; 15—handle; 16—movable slot; 18—mounting tube; 19—adjustment knob; 21—light source; 221—imaging lens; 222—adjustment lens; 223—wide-angle lens; 31—drive motor; 32—driving gear; 40—film disc; 41—housing; 411—guiding slot; 42—rotating disc; 421—driven gear; 43—electronic tag; 51—control panel; 52—identification module; 54—speaker; 60—mounting shell; 62—spring clip; 71—lift rod; 711—top plate; 712—limiting plate; 713—second reset spring; 714—movable roller; 72—push rod; 721—abutment block; 722—limiting block; 723—operating button; 724—first reset spring; 80—operating cavity; 81—limiting base; and 82—limiting slot.

The objectives, functions, features, and advantages of the present invention are further explained with reference to the embodiments and the accompanying drawings.

DESCRIPTION OF EMBODIMENTS

The following clearly and completely describes the technical solutions in embodiments of the present invention with reference to the accompanying drawings in embodiments of the present invention. It is clear that the described embodiments are merely some but not all of embodiments of the present invention. All other embodiments obtained by a person of ordinary skill in the art based on embodiments of this application without creative efforts shall fall within the protection scope of the present invention.

It should be noted that, directional indications (such as up, down, left, right, front, back, and the like) in embodiments of the present invention are only used to explain a relative positional relationship and movement of various components in a specific posture (as shown in the accompanying drawings). If the specific posture changes, the directional indication changes accordingly.

In addition, descriptions involving terms "first", "second", and the like in embodiments of the present invention are merely intended for a purpose of description, and shall not be understood as an indication or implication of relative importance or implicit indication of the number of indicated technical features. Therefore, a feature limited by "first" or "second" may explicitly or implicitly include at least one feature. In addition, the term "and/or" in the specification refers to three parallel options. For example, the term "A and/or B" includes an option A, an option B, or an option that satisfies both A and B. In addition, the technical solutions between various embodiments can be combined with each other, provided that such combination can be implemented by a person of ordinary skill in the art. Combinations resulting in contradictions or technical infeasibility shall be deemed non-existent and excluded from the protection scope of the present invention.

The present invention provides a projector, used for projecting patterns on a film onto a light-shadow projection surface for display.

In embodiments of the present invention, as shown in FIG. 1 to FIG. 6, the projector includes: a body 10 and a film disc 40 that carries the film, where the body 10 is provided with an insertion slot 11 and a projection aperture 12, and the film disc 40 is movably inserted into the insertion slot 11;

the film disc 40 includes a housing 41 and a rotating disc 42 that is rotatably installed within the housing 41, with the film positioned on the rotating disc 42 and disposed corresponding to the projection aperture 12;

the body 10 includes an optical assembly and a drive assembly located within the body 10, where the optical assembly emits light towards the projection aperture 12, and the film is located between the optical assembly and the projection aperture 12; and the drive assembly includes a drive motor 31 and a driving gear 32 installed on a drive shaft on the drive motor 31, and one side of the rotating disc 42 is provided with a driven gear 421 that engages with the driving gear 32, where both the driving gear 32 and the driven gear 421 are face gears.

The body 10 is a main structure of the projector used for projection, including the optical assembly and the drive assembly. The insertion slot 11 is used for installing the film disc 40. It should be noted that the film disc 40 can be movably inserted into the insertion slot 11, to facilitate a user in replacing the film disc 40. The film disc 40 includes the housing 41 and the rotating disc 42 that is rotatably installed within the housing 41. The film is fixedly installed on the rotating disc 42, and a pattern area of the film accurately corresponds to the projection aperture 12, to ensure that when the rotating disc 42 rotates, the patterns on the film periodically appears in front of the projection aperture 12.

In addition, a position of the body 10 corresponding to the insertion slot 11 is recessed to form an avoidance slot 14. The avoidance slot 14 is used for guiding the installation and positioning of the film disc 40, to ensure that the film disc 40 can be accurately inserted into the body 10 and properly aligned with the optical assembly. The design of the avoidance slot 14 can effectively prevent the misalignment of the film disc 40 during installation, to improve the accuracy and stability of the operation. The depth and shape of the avoidance slot 14 have been optimized, ensuring stable installation of the film disc 40 while also allowing for easy and quick removal by the user during disassembly.

The optical assembly serves as a light-emitting component of the projector, and the optical assembly is installed within the body 10, with a light emission direction aligned with the projection aperture 12. The film is located between the optical assembly and the projection aperture 12, so that when the optical assembly emits light, the light passes through the film and is projected onto the light-shadow projection surface, forming a clear and even pattern display. Specifically, the optical assembly includes at least one light source 21 and a plurality of lenses, and the plurality of lenses are set at intervals between the light source 21 and the projection aperture 12. The setting of the plurality of lenses can effectively adjust a refraction path of the light, to ensure that the light emitted from light source 21 can be evenly and clearly projected through the projection aperture 12 onto the film, forming a stable image projection. The arrangement and spacing of the lenses are precisely designed to minimize light loss and distortion during transmission, thereby enhancing projection quality and clarity.

The lenses may include an imaging lens 221, an adjustment lens 222, and a wide-angle lens 223 that are set in sequence along a projection direction of the film. The imaging lens 221 is configured to collect effective pattern light spots passing through the film, to form a real image pattern projected onto the adjustment lens 222. The adjustment lens 222 is configured to reorganize and correct the real image before projecting the real image onto the wide-angle lens 223. The wide-angle lens 223 is configured to magnify the adjusted real image pattern and project the real image onto the light-shadow projection surface, thus presenting a clear magnified pattern effect on the light-shadow projection surface. The plurality of lenses with different functions are set to effectively enhance the clarity of the patterns projected by the projection device, thereby substantially improving the practicality of the projection device.

In addition, the optical assembly further includes a mounting tube 18 and an adjustment knob 19 located at the projection aperture 12. The mounting tube 18 is configured to secure the imaging lens 221, the adjustment lens 222, and the wide-angle lens 223, to ensure that the imaging lens 221, the adjustment lens 222, and the wide-angle lens 223 are aligned on the same axis. This prevents changes in relative positions of the imaging lens 221, the adjustment lens 222, or the wide-angle lens 223 when the projection device is subjected to external forces, to otherwise affect the projection quality of the projection device. The adjustment knob 19 is movably connected to the mounting tube 18, and when the adjustment knob is rotated, the mounting tube 18 is driven to move back and forth along the axial direction to adjust a size of the projection patterns of the projector.

The drive assembly includes the drive motor 31 and the driving gear 32 disposed on an output shaft. One side of the rotating disc 42 is provided with the driven gear 421 that meshes with the driving gear 32. Both the driving gear 32 and the driven gear 421 are face gears, so when the film disc 40 is inserted into the body 10 from the insertion slot 11, the rotating disc 42 aligns centrally with a motor shaft of the drive motor 31. In this case, when the drive motor 31 is enabled, the driving gear 32 and the driven gear 421 are meshed to drive the rotating disc 42 to rotate smoothly, allowing the film installed on the film disc 40 to continuously and evenly pass through the projection aperture 12, thereby realizing the dynamic display of story patterns. In addition, the meshing of the face gears effectively reduces the installation space of the drive structure, to improve the practicality and user experience of the projector.

The projector according to the present invention includes the projector body 10 and the film disc 40 that carries the film. The projector body 10 is provided with the insertion slot 11 and the projection aperture 12, and the film disc 40 is movably inserted into the insertion slot 11, to secure the film on the rotating disc 42 corresponding to the projection aperture 12. The projector body 10 is provided with the optical assembly and the drive assembly. The light emitted by the optical assembly travels along a fixed path, illuminating the film through the film disc 40, and then is output through the projection aperture 12 to display the patterns. The drive assembly includes the drive motor 31 and the driving gear 32 installed on the drive shaft on the drive motor. The driving gear 32 meshes with the driven gear 421 disposed on the side of the rotating disc 42 (both the driving gear and the driven gear are face gears), to ensure even and precise rotation of the rotating disc 42. According to the foregoing structural design, the film disc 40 maintains stable positioning within the projector body 10 while achieving smooth rotation under the action of the drive assembly. Even in cases of external vibrations or tilts, the patterns on the film can still be accurately aligned with the optical assembly and the projection aperture 12, to ensure the clarity, continuity, and stability of the projected images. Therefore, the projector according to the present invention not only facilitates convenient replacement and installation of the film disc 40 but also significantly enhances the projection quality through the precise drive and optical system design, thereby greatly enhancing the device's practicality and the user experience in actual applications.

Further, as shown in FIG. 1 to FIG. 6, an outer wall of the housing 41 is provided with a guiding slot 411, and the driven gear 421 is located within the guiding slot 411. In this embodiment, the guiding slot 411 extends from the driven gear 421 to a circumferential side of the housing 41 and passes through one side of the housing 41, to form a path for the movement of the driving gear 32. When the film disc 40 is inserted into the projector body 10, the driving gear 32 can move along the guiding slot 411 from an opening on one side of the housing 41, gradually entering the guiding slot 411 and achieving precise meshing with the driven gear 421. The structural design ensures the smoothness of the gear meshing, enhances the stability of the transmission components, and prevents gear misalignment or jamming caused by assembly errors or improper operation. In addition, the setting of the guiding slot 411 allows the driving gear 32 to move along a preset path, to simplify the installation operation of the film disc 40 and enhance the user experience and the practicality of the device.

Further, as shown in FIG. 1 to FIG. 6, the projector further includes an audio assembly housed within the body 10 and an electronic tag 43 installed on the film disc 40 and electrically connected to the audio assembly; and the audio assembly includes a control panel 51, an identification module 52 for identifying the electronic tag 43, a storage medium pre-stored with audio corresponding to the electronic tag 43, and a speaker 54 electrically connected to the control panel 51. In this embodiment, the audio assembly is configured to identify the electronic tag 43, and play corresponding audio content based on information stored in the electronic tag 43. The storage content of electronic tag 43 corresponds to content of the patterns on the film, allowing the projector to simultaneously output sound effects or narrations that match the image when the projector displays the image. The design not only enhances an immersive projection effect but also helps the user understand the projected content more intuitively, to improve the interactivity and practicality of the projector. In addition, through an automatic identification function of the electronic tag 43, the projector can automatically load the corresponding audio content based on different film discs 40, to avoid cumbersome operations of manual audio selection by the user, making the projector convenient to use.

Further, the identification module 52 is configured to detect and read the information in the electronic tag 43, and transmit the retrieved information to the control panel 51. The control panel 51 parses the information from the electronic tag 43 and extracts audio data corresponding to the electronic tag 43 from the storage medium. Then, the control panel 51 controls the speaker 54 to play the corresponding audio content, allowing the projector to simultaneously output the sound effects or the narrations that match the film patterns. The design ensures the accuracy and automation of audio playback, and improves the user's viewing experience. In addition, the storage medium can pre-store a plurality of sets of audio data for different film discs 40 to meet the needs of various projection content, to further improve the practicality and interactivity of the projector.

In addition, the rotating disc 42 is further provided with a reset mark, and the body 10 is provided with an identification module 52 for identifying the reset mark. The identification module 52 is electrically connected to the control panel 51, and the drive assembly is electrically connected to the control panel 51, so that when the identification module 52 identifies the reset mark, the control panel controls the drive assembly to drive the rotating disc 42 to rotate to an initial position of the film patterns.

Further, as shown in FIG. 1 to FIG. 6, an inner wall of the body 10 is provided with a mounting shell 60 corresponding to the insertion slot 11, and the film disc 40 passes through the insertion slot 11 and is installed in the mounting shell 60; and the mounting shell 60 is provided with at least one spring clip 62, where the spring clip 62 abuts movably against the outer wall of the film disc 40. In this embodiment, the mounting shell 60 is fixed to the inner wall of the housing 41 and is located corresponding to the insertion slot 11, to ensure that the film disc 40 can be stably and precisely installed within the body 10.

The spring clip 62 is configured to secure the film disc 40. Specifically, the spring clip 62 is disposed on the inner wall of the mounting shell 60 and partially protrudes onto the interior of the mounting shell 60. When the film disc 40 is inserted into the mounting shell 60, the spring clip 62 provides continuous pressing forces through the elastic action, to effectively prevent the film disc 40 from loosening or shifting during use, ensure that the film disc 40 remains in a stable position within the projector, and avoid instability or image displacement caused by vibration or external forces.

There may be a plurality of spring clips 62, to provide greater pressing forces for the film disc 40.

Further, as shown in FIG. 1, a side wall of the body 10 is further provided with a plurality of storage slots 13 for storing the film disc 40. In this embodiment, the design of the storage slot 13 allows the user to easily store a plurality of film discs 40, and each storage slot 13 is of an appropriate size to ensure that the film disc 40 can be securely placed without easily sliding or falling off. The number and position of the storage slots 13 have been carefully set to facilitate the user in quickly taking and placing different film discs 40, to improve the practicality and convenience of the device.

Further, as shown in FIG. 1 to FIG. 5, the body 10 further includes a handle 15, the outer wall of the body 10 is provided with a movable slot 16, and the handle 15 is movably installed in the movable slot 16. In this embodiment, the design of the handle 15 allows the user to adjust the position of the handle 15 as needed, providing a convenient carrying method while also allowing the handle 15 to be stored within the movable slot 16 when not in use, to avoid occupying excessive space. The setting of the movable slot 16 ensures the stability of the handle 15 and can prevent the handle 15 from accidentally falling off or shifting during use. The design increases the product's portability and enhances safety and stability during use.

Further, as shown in FIG. 1 to FIG. 5, the body 10 further includes a triggering mechanism, the triggering mechanism includes a push rod 72 and a lift rod 71, the body 10 is provided with a mounting hole, the mounting shell 60 is provided with a movable hole, the lift rod 71 passes through the movable hole and abuts against the film disc 40, one end of the lift rod 71 close to the push rod 72 is provided with a movable roller 714, the push rod 72 passes through the mounting hole, one end of the push rod 72 close to the movable roller 714 is provided with an abutment block 721, and the abutment block 721 is inclined on a side that abuts against the movable roller 714. In this embodiment, the triggering mechanism is used for automatically releasing or pushing the film disc 40 when the user needs to replace or adjust the film disc 40. Specifically, the push rod 72 pushes the lift rod 71, causing the movable roller 714 on the lift rod 71 to come into contact with the film disc 40, to enable the film disc 40 to be pushed outward or released under the action of the push rod 72. The inclined design of the abutment block 721 can ensure that the movable roller 714 can be in smooth contact with the film disc 40 when the force is applied to the lift rod 71, to ensure the safe movement and release of the film disc 40. In addition, the collaborative design of the push rod 72 and the lift rod 71 can effectively control the operation of the film disc 40, to ensure stable operation of the device and prevent inaccuracies in the position or displacements of the film disc 40 due to improper operations.

Further, as shown in FIG. 1 to FIG. 5, a bottom of the mounting shell 60 is provided with an operating cavity 80, and the movable roller 714 and the abutment block 721 are located within the operating cavity 80; and an operating button 723 is provided at the other end of the push rod 72 opposite the abutment block 721, the operating button 723 is located inside the mounting hole, and a first reset spring 724 is sleeve-mounted on an outer wall of the push rod 72, with one end of the first reset spring 724 abutting against an outer wall of the operating cavity 80 and the other end abutting against the operating button 723. In this embodiment, the setting of the operation cavity 80 facilitates the free movement of the push rod 72 and the lift rod 71, while ensuring that the movable roller 714 and the abutment block 721 can work together smoothly within the mounting shell 60. Specifically, the design of the operation cavity 80 ensures that the movement of the triggering mechanism is not interfered with by another component, providing sufficient space for the push rod 72, the lift rod 71, and accessories to move appropriately. When the triggering mechanism is enabled, the push rod 72 pushes the lift rod 71 through the operating cavity 80, to further enable more precise contact between the movable roller 714 and the film disc 40. The collaborative design of the abutment block 721 and the movable roller 714 can effectively prevent jamming caused by imbalance or excessive resistance, to ensure that the film disc 40 is pushed or released smoothly and quickly, and effectively improve the stability and durability of the device.

The setting of operating button 723 allows the user to drive the push rod 72 to perform operations by applying external forces. Specifically, when the user presses the operating button 723, the push rod 72 is subjected to the external forces, pushing the lift rod 71 to move towards the film disc 40, to trigger the film disc 40 to perform operations.

The first reset spring 724 is designed for automatic resetting. When the user stops pressing the operating button 723, the first reset spring 724 uses elastic forces to reset the push rod 72, to ensure that the push rod 72 automatically returns to an initial position without any external force. This ensures that the device is in a normal and stable state after each operation, to avoid long-term abnormal positioning of the device due to improper operations.

Through the synergy of the first reset spring 724 and the operating button 723, smooth advancement and resetting of the push rod 72 can be achieved in this embodiment, to enhance the operating comfort and stability of the device, and improve the user experience.

Further, as shown in FIG. 1 to FIG. 5, a limiting base 81 is disposed on an inner wall of the operating cavity 80 corresponding to the movable hole, a top plate 711 is provided at one end of the lift rod 71 that abuts against the film disc 40, a limiting plate 712 is provided at the other end, the limiting plate 712 is located within the limiting base 81, a second reset spring 713 is sleeve-mounted on the outer wall of the lift rod 71, with one end of the second reset spring 713 abutting against the bottom of the mounting shell 60 and the other end abutting against the limiting plate 712. In this embodiment, the collaborative design of the limiting base 81 and the limiting plate 712 can effectively restrict a displacement range of the lift rod 71, to prevent instability or jamming caused by excessive movement of the lift rod 71 during operation. Specifically, when the lift rod 71 is in contact with the film disc 40 during pushing, the top plate 711 pushes the film disc 40 to an appropriate position, and the limiting plate 712 ensures that the movement of the lift rod 71 does not exceed a set range, thereby preventing device damage or operation errors.

The second reset spring 713 is used for automatically resetting the lift rod 71 to the initial position when the lift rod 71 is no longer subjected to the force, to ensure that the device can be in a normal working state after each operation. The elastic design of the reset spring also ensures smooth operation. When the lift rod 71 is pushed towards the film disc 40 and released, the reset spring provides sufficient restorative force, allowing the lift rod 71 to quickly return to the original position, to ensure the consistency and stability in each operation. The limiting base 81 can prevent the lift rod 71 from excessive movement, to further improve the reliability and prolong service life of the system.

Further, as shown in FIG. 1 to FIG. 5, the inner wall of the operating cavity 80 is provided with a limiting slot 82, limiting blocks 722 are disposed on both sides of the bottom of the abutment block 721, and the limiting blocks 722 are slidably fitted into the limiting slot 82. In this embodiment, the collaborative design of the limiting slot 82 and the limiting block 722 can precisely control a movement range of the abutment block 721, to ensure that the operations of the push rod 72 and the lift rod 71 is stable and controllable. Specifically, the sliding of the limiting block 722 within the limiting slot 82 restricts the movement range of the abutment block 721, to effectively prevent excessive displacement or misalignment of the abutment block 721 during operation, and ensure that motion of the push rod 72 and the lift rod 71 remains within a preset range, thereby enhancing operational accuracy.

According to the design, the abutment block 721 can smoothly slide within the limiting slot 82 during user operation, to avoid device jamming or damage caused by excessive movement. The optimization of the structure ensures smooth operations and effectively enhances the durability and long-term stability of the device. In addition, the matching of the limiting slot 82 and the limiting block 722 also makes the assembly of the component more precise, to avoid excessive or insufficient deviations, thereby further ensuring the precision and reliability of the entire device.

The foregoing descriptions are merely optional embodiments of the present invention and do not limit the patent scope of the present invention. Any equivalent structural transformations made with reference to the specification and the accompanying drawings of the present invention under the inventive concept of the present invention, or direct/indirect applications in other related technical fields, are included within the patent protection scope of the present invention.

The invention claimed is:

1. A projector, used for projecting patterns on a film onto a light-shadow projection surface for display, wherein the projector comprises: a body and a film disc that carries the film, wherein the body is provided with an insertion slot and a projection aperture, and the film disc is movably inserted into the insertion slot;

the film disc comprises a housing and a rotating disc that is rotatably installed within the housing, with the film positioned on the rotating disc and disposed corresponding to the projection aperture;

the body comprises an optical assembly and a drive assembly located within the body, wherein the optical assembly emits light towards the projection aperture, and the film is located between the optical assembly and the projection aperture; and the drive assembly comprises a drive motor and a driving gear installed on a drive shaft on the drive motor, and one side of the rotating disc is provided with a driven gear that engages with the driving gear, wherein both the driving gear and the driven gear are face gears;

an inner wall of the body is provided with a mounting shell corresponding to the insertion slot, and the film disc passes through the insertion slot and is installed in the mounting shell; and the mounting shell is provided with at least one spring clip, wherein the spring clip abuts movably against the outer wall of the film disc.

2. The story projector according to claim 1, wherein an outer wall of the housing is provided with a guiding slot, and the driven gear is located within the guiding slot.

3. The projector according to claim 1, wherein the projector further comprises an audio assembly housed within the body and an electronic tag installed on the film disc and electrically connected to the audio assembly; and the audio assembly comprises a control panel, an identification module for identifying the electronic tag, a storage medium pre-stored with audio corresponding to the electronic tag, and a speaker electrically connected to the control panel.

4. The projector according to claim 1, wherein a side wall of the body is further provided with a plurality of storage slots for storing the film disc.

5. The projector according to claim 1, wherein the body further comprises a handle, the outer wall of the body is provided with a movable slot, and the handle is movably installed in the movable slot.

6. The projector according to claim 1, wherein the body further comprises a triggering mechanism, the triggering mechanism comprises a push rod and a lift rod, the body is provided with a mounting hole, the mounting shell is provided with a movable hole, the lift rod passes through the movable hole and abuts against the film disc, one end of the lift rod close to the push rod is provided with a movable roller, the push rod passes through the mounting hole, one end of the push rod close to the movable roller is provided with an abutment block, and the abutment block is inclined on a side that abuts against the movable roller.

7. The projector according to claim 6, wherein a bottom of the mounting shell is provided with an operating cavity, and the movable roller and the abutment block are located within the operating cavity; and
an operating button is provided at the other end of the push rod opposite the abutment block, the operating button is located inside the mounting hole, and a first reset spring is sleeve-mounted on an outer wall of the push rod, with one end of the first reset spring abutting against an outer wall of the operating cavity and the other end abutting against the operating button.

8. The projector according to claim 7, wherein a limiting base is disposed on an inner wall of the operating cavity corresponding to the movable hole, a top plate is provided at one end of the lift rod that abuts against the film disc, a limiting plate is provided at the other end, the limiting plate is located within the limiting base, a second reset spring is sleeve-mounted on the outer wall of the lift rod, with one end of the second reset spring abutting against the bottom of the mounting shell and the other end abutting against the limiting plate.

9. The projector according to claim 8, wherein the inner wall of the operating cavity is provided with a limiting slot, limiting blocks are disposed on both sides of the bottom of the abutment block, and the limiting blocks are slidably fitted into the limiting slot.

* * * * *